Patented Oct. 12, 1926.

1,602,542

UNITED STATES PATENT OFFICE.

JOHN W. MARDEN, OF SWISSVALE, PENNSYLVANIA, ASSIGNOR TO WESTINGHOUSE LAMP COMPANY, A CORPORATION OF PENNSYLVANIA.

REDUCTION OF RARE-METAL OXIDES.

No Drawing. Application filed January 6, 1921. Serial No. 435,542.

This invention relates to the reduction of oxides, more especially oxides of the rare metals, by means of other metals.

Previously, in producing rare or refractory metals, generally in powder form, from the oxides, such as of zirconium, titanium, uranium, thorium, tungsten, molybdenum, and the like, it was customary to prepare the pure oxides in finely divided form, mix the same with a large excess of ground, metallic calcium, and place the mixture in a closed crucible or bomb in an atmosphere free from oxygen. The bomb was then heated until a reaction took place between the rare-metal oxide and the calcium which resulted in the formation of the rare metal and calcium oxide. After the reaction was complete, the apparatus was cooled and then opened, and the calcium oxide removed by means of water and dilute acids. The material was then washed with alcohol and ether and dried at a relatively high temperature.

This method is fairly well adapted for the production of various rare-metal powders, but the use of calcium for the reduction is subject to several disadvantages. It is, as purchased on the market, relatively impure and introduces undesirable substances into the metal formed, and is comparatively expensive.

My invention is designed to produce the rare metals in a convenient manner by a process similar to that used hitherto but by means of a different metal which has many advantages over the calcium hitherto used. I propose the use of magnesium, in the form of powder or as filings, for the reduction of oxides to form the metals, said reduction being practiced in an inert environment.

Although magnesium reacts with nitrogen of the air to form the nitride more readily than does calcium, if air is entirely excluded from the reaction chamber and the magnesium is heated to a sufficiently high temperature to, at least partially, vaporize the same and thereby allow it to penetrate to all portions of the oxide being reduced, the reduction of such oxide to metal is complete.

The use of magnesium in place of calcium has several distinct advantages thereover. It may be obtained in a much purer state than calcium, thus avoiding the introduction of impurities, such as silica, carbides and the like, which are found in the calcium. The cost of magnesium is a very small fraction of the cost of calcium. The atomic weight thereof, being about 60% of that of calcium, the same amount of rare metal may be produced by employing a correspondingly smaller amount of reducing metal. The vaporization temperature of magnesium is low and well within the range of ordinary bomb reaction temperatures.

The vapor pressure of magnesium reaches atmospheric pressure at a temperature of 1120° C. However, the reaction thereof in a closed bomb proceeds at a temperature much below 1120° C. Magnesium has an appreciable vapor pressure at 600° C., which becomes 1 mm. at 650° C., rapidly rising to 760 mm. at 1120° C. At a bright red heat, the vaporization of magnesium in the reaction bomb is sufficient to start the reaction, after which the vaporization of the magnesium is accelerated by the heat of reaction, which goes to completion unaided.

A specific example of the operation of my new method for the production of metals, is as follows: 100 grams of zirconium oxide is mixed with 45 grams of magnesium powder and placed in a bomb. The bomb is fitted with an inlet in the cap thereof, and hydrogen is passed in therethrough to displace the air before the bomb is finally sealed. The bomb is then heated to start the reaction which progresses, without the aid of external heat, by means of the heat of reaction.

By providing an atmosphere of hydrogen in the bomb and displacing all the air therein, I prevent the formation, in the mixture, of nitride which cannot easily be removed. A small amount of hydride is formed but this is not objectionable since the hydride is separated easily upon heating in a vacuum. The contents of the bomb are allowed to cool and the bomb is then opened. The mixture of zirconium powder, magnesium oxide, and magnesium is treated several times with water and then with dilute acids, such as hydrochloric, nitric, and the like, to remove all magnesium and magnesium oxide from the mixture, which is then washed with water to remove the acid. The zirconium powder may then be dried by means of alcohol and ether, or chloroform, after which it is heated in a vacuum to a relatively high temperature to decompose any hydride and thus form the pure zirconium powder if the so called activated form of metal powder is desired.

A similar reaction may be caused between other metal oxides and magnesium, it being merely necessary to use the proper proportion of magnesium for the complete reduction of the various oxides. I generally prefer to use 100% excess of magnesium to make the reduction of the metal complete. In the case of uranium, which is among the most reactive of the rare metals, special precautions should be taken in the process to prevent formation of nitrides and oxidation of the reduced metal after the completion of the reaction. In removing the magnesium oxide, acetic acid should be used on account of the relatively great solubility of uranium in the powder form in mineral acids.

I claim as my invention:—

1. A method of producing refractory metal powder of the groups including zirconium, titanium, thorium, uranium, tungsten, molybdenum and the like, which comprises heating a compound of the metal to be formed with magnesium in an inert environment and within a closed container.

2. A method of producing refractory metal powder of the groups including zirconium, titanium, thorium, uranium, tungsten, molybdenum and the like, which comprises heating a compound of the metal to be formed with magnesium to a temperature above the vaporization point of magnesium, said heating being done in a closed container from which the air has been excluded.

3. A method of producing refractory metal powder of the groups including zirconium, titanium, thorium, uranium, tungsten, molybdenum and the like, which comprises heating a compound of the metal to be formed with magnesium to a temperature above 600° C., said heating being done in a closed container from which the air has been excluded.

4. A method of producing refractory metal powder of the groups including zirconium, titanium, thorium, uranium, tungsten, molybdenum and the like, which comprises heating a compound of the metal to be formed with magnesium in an atmosphere of hydrogen, said heating being done in a closed container from which the air has been excluded.

5. A method of producing refractory metal powder of the groups including zirconium, titanium, thorium, uranium, tungsten, molybdenum and the like, which comprises mixing a compound of the metal to be formed with finely divided magnesium, placing said mixture in a container, closing said container, removing the air therefrom, heating said container to start the reaction, and permitting the reaction to progress by the heat of the reaction alone.

6. A method of producing refractory metal powder of the groups including zirconium, titanium, thorium, uranium, tungsten, molybdenum and the like, which comprises mixing a compound of the metal to be formed with magnesium, heating the mixture in a closed container to a temperature above the point where the vaporization of magnesium begins, permitting the reaction to progress by the heat of the reaction alone, and then recovering the metal powder.

7. A method of producing refractory metal powder of the groups including zirconium, titanium, thorium, uranium, tungsten, molybdenum and the like, which comprises heating a refractory metal oxide with magnesium in a closed container and in an inert environment, and removing the products of the reaction except the metallic powder.

8. A method of producing refractory metal powder of the groups including zirconium, titanium, thorium, uranium, tungsten, molybdenum and the like, which comprises heating a refractory metal oxide with magnesium to a temperature above the vaporization point of magnesium, said heat-treatment being conducted in a closed bomb with the air excluded.

9. A method of producing zirconium powder which comprises heating zirconium oxide with magnesium in an atmosphere of hydrogen above the vaporization point of magnesium.

In testimony whereof, I have hereunto subscribed my name this 30th day of December, 1920.

JOHN W. MARDEN.